(12) United States Patent
Mickelsen et al.

(10) Patent No.: US 8,695,720 B2
(45) Date of Patent: *Apr. 15, 2014

(54) FIREPROOF SYSTEMS IN AIRCRAFT ENGINES

(75) Inventors: Justin C. Mickelsen, Gilbert, AZ (US); Dave Dischinger, Tempe, AZ (US); Martin Baker, Budd Lake, NJ (US)

(73) Assignee: Honeywell International Inc., Morristown, NJ (US)

( * ) Notice: Subject to any disclaimer, the term of this patent is extended or adjusted under 35 U.S.C. 154(b) by 736 days.

This patent is subject to a terminal disclaimer.

(21) Appl. No.: 12/914,423

(22) Filed: Oct. 28, 2010

(65) Prior Publication Data

US 2012/0103638 A1  May 3, 2012

(51) Int. Cl.
*A62C 2/00* (2006.01)

(52) U.S. Cl.
USPC ........ 169/45; 169/9; 169/11; 169/26; 169/46; 169/49; 169/62; 169/70; 60/39.091; 244/129.2; 428/920

(58) Field of Classification Search
USPC ............. 169/9, 11, 19, 26, 45–49, 54, 62, 70; 60/39.091, 779; 244/129.2; 428/920
See application file for complete search history.

(56) References Cited

U.S. PATENT DOCUMENTS

| | | | | |
|---|---|---|---|---|
| 3,710,855 A | * | 1/1973 | Osorio | 169/26 |
| 3,874,458 A | * | 4/1975 | Williams | 169/65 |
| 5,518,075 A | * | 5/1996 | Williams | 169/65 |
| 6,105,677 A | * | 8/2000 | Stager | 169/26 |
| 7,472,758 B1 | * | 1/2009 | Stevens et al. | 169/65 |
| 2004/0216903 A1 | | 11/2004 | Wierenga et al. | |
| 2005/0257937 A1 | | 11/2005 | Fabre | |
| 2006/0273223 A1 | | 12/2006 | Haaland et al. | |

* cited by examiner

*Primary Examiner* — Steven J Ganey
(74) *Attorney, Agent, or Firm* — Ingrassia Fisher & Lorenz, P.C.

(57) ABSTRACT

A fireproof system is provided for protecting a structure during a fire event. The system includes a fire resistant panel defining a first attachment opening and disposed adjacent to the structure; a canister including a side wall defining a first end and a second end, and an end wall enclosing the first end and defining a second attachment opening that is aligned with the first attachment opening; a fastener extending through the canister at the second attachment opening and the fire resistant panel at the first attachment opening such that the canister, the fire resistant panel, and the structure are fastened together; and a fire retardant agent disposed within the canister in an inactive condition and configured to transition out of the second end of the canister in an active condition at a predetermined temperature.

15 Claims, 3 Drawing Sheets

US 8,695,720 B2

FIREPROOF SYSTEMS IN AIRCRAFT ENGINES

TECHNICAL FIELD

The present invention relates to gas turbine engines, and more particularly relates to fireproof systems in gas turbine engines.

BACKGROUND

A gas turbine engine is used to power various types of vehicles and systems. A particular type of gas turbine engine that may be used to power aircraft is a turbofan gas turbine engine. A turbofan gas turbine engine may include, for example, five major sections: a fan section, a compressor section, a combustor section, a turbine section and an exhaust section.

The fan section is positioned at the inlet section of the engine and includes a fan that induces air from the surrounding environment into the engine and accelerates a fraction of this air toward the compressor section. The compressor section raises the pressure of the air it receives from the fan section and directs a majority of the high pressure air into the combustor section. In the combustor section, the high pressure air is mixed with fuel and combusted. The high-temperature combusted air is then directed into the turbine section where it expands through and rotates each turbine to drive various components within the engine or aircraft. The air is then exhausted through a propulsion nozzle disposed in the exhaust section.

In order to meet certification requirements, portions of aircraft, such as the engines, are required to be able to function for a specific period of time when exposed to fire, for example in the event of an engine fire. As such, portions of the engine are provided with fireproof systems, such as firewalls or fire resistant panels. To maximize protection or to meet certification requirements, convention techniques include increasing the thickness of the fire resistant panels or adding additional structures. However, these techniques typically increase the overall weight of the engine, which may undesirably decrease engine thrust to weight efficiency.

Accordingly, it is desirable to provide fireproof systems with improved performance but without unduly increasing the weight of the engine. Furthermore, other desirable features and characteristics of the present invention will become apparent from the subsequent detailed description of the invention and the appended claims, taken in conjunction with the accompanying drawings and this background of the invention.

BRIEF SUMMARY

In one exemplary embodiment, a fire retardant device is provided for protecting a structure during a fire event. The device includes a container including a side wall defining a first end and a second end, and an end wall enclosing the first end and defining an opening for mounting the fire retardant device onto the structure. The device further includes a fire retardant agent disposed within the canister in an inactive condition and configured to transition out of the second end of the canister in an active condition at a predetermined temperature during the fire event.

In another exemplary embodiment, a fireproof system is provided for protecting a structure during a fire event. The system includes a fire resistant panel defining a first attachment opening and disposed adjacent to the structure; a canister including a side wall defining a first end and a second end, and an end wall enclosing the first end and defining a second attachment opening that is aligned with the first attachment opening; a fastener extending through the canister at the second attachment opening and the fire resistant panel at the first attachment opening such that the canister, the fire resistant panel, and the structure are fastened together; and a fire retardant agent disposed within the canister in an inactive condition and configured to transition out of the second end of the canister in an active condition at a predetermined temperature In yet another exemplary embodiment, a method is provided for suppressing a fire event proximate to an aircraft engine component. The method includes the steps of installing a fire resistant panel on the aircraft engine component at a first attachment point; providing a canister with a fire retardant agent disposed therein; and mounting the canister on the fire resistant panel at the first attachment point.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

Broadly, exemplary embodiments discussed herein provide improved fireproof systems for gas turbine engines. An exemplary fireproof system includes a fire resistant panel mounted on a structure to be protected at an attachment point. The fireproof system further includes a fire retardant device with a canister mounted on the fire resistant panel at the attachment point. During a fire event, a fire retardant agent disposed within the fire retardant canister is activated to suppress the fire, particularly in the area of the attachment point.

Figure 1:
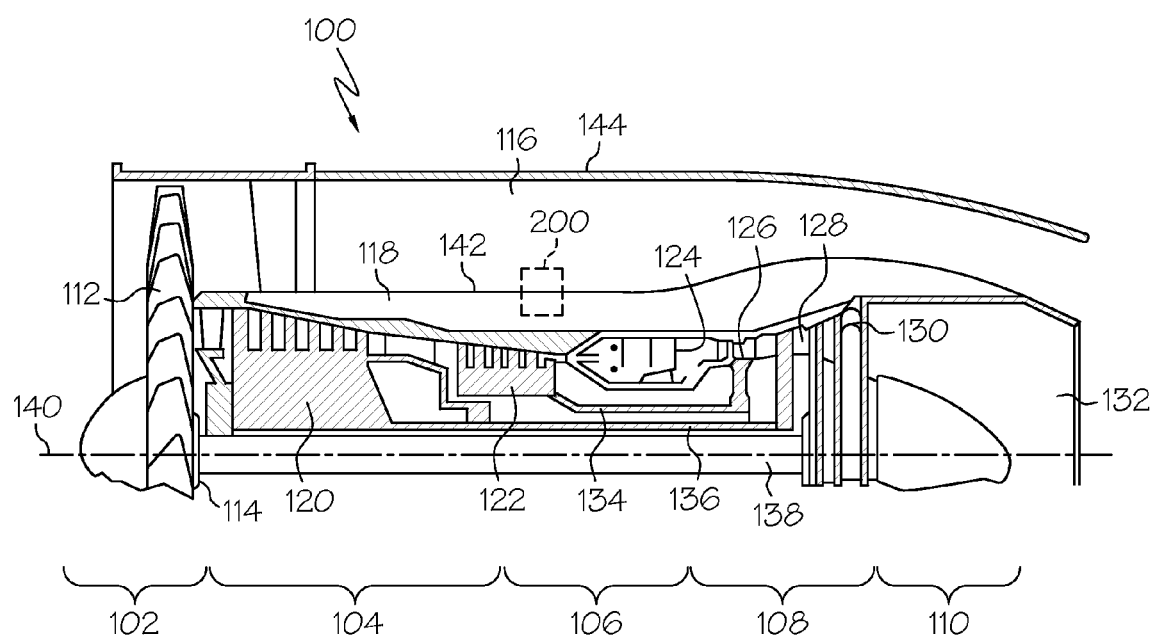
FIG. 1 is a partial, cross-sectional view of a gas turbine engine in accordance with an exemplary embodiment.

FIG. 1 is a partial, cross-sectional view of a gas turbine engine 100 in accordance with an exemplary embodiment with the remaining portion of the gas turbine engine 100 being axi-symmetric about a longitudinal axis 140. In the depicted embodiment, the gas turbine engine 100 is an annular multi-spool turbofan gas turbine jet engine 100 within an aircraft, although other arrangements and uses may be provided. The engine 100 may be, for example, an auxiliary power unit ("APU").

The engine 100 includes fan section 102, a compressor section 104, a combustor section 106, a turbine section 108, and an exhaust section 110. The fan section 102 includes a fan 112 mounted on a rotor 114 that draws air into the engine 100 and accelerates it. A fraction of the accelerated air exhausted from the fan 112 is directed through an outer (or first) bypass duct 116 and the remaining fraction of air exhausted from the fan 112 is directed into the compressor section 104. The outer bypass duct 116 is generally defined by an inner casing 142 and an outer casing 144.

In the embodiment of FIG. 1, the compressor section 104 includes an intermediate pressure compressor 120 and a high pressure compressor 122. However, in other embodiments, the number of compressors in the compressor section 104 may vary. In the depicted embodiment, the intermediate pressure compressor 120 and the high pressure compressor 122 sequentially raise the pressure of the air and direct a majority of the high pressure air into the combustor section 106. A fraction of the compressed air bypasses the combustor section 106 and is used to cool, among other components, turbine blades in the turbine section 108 via an inner (or second) bypass duct 118. The inner bypass duct 118 is generally defined by the inner casing 142 and the interior components of the engine 100, such as the compressors 120 and 122.

In the combustor section 106, which includes an annular combustor 124, the high pressure air is mixed with fuel and combusted. The high-temperature combusted air is then directed into the turbine section 108. In the embodiment of FIG. 1, the turbine section 108 includes three turbines disposed in axial flow series, namely, a high pressure turbine 126, an intermediate pressure turbine 128, and a low pressure turbine 130. However, it will be appreciated that the number of turbines, and/or the configurations thereof, may vary. In the embodiment depicted in FIG. 1, the high-temperature combusted air from the combustor section 106 expands through and rotates each turbine 126, 128, and 130. The air is then exhausted through a propulsion nozzle 132 disposed in the exhaust section 110. As the turbines 126, 128, and 130 rotate, each drives equipment in the engine 100 via concentrically disposed shafts or spools. Specifically, the high pressure turbine 126 drives the high pressure compressor 122 via a high pressure spool 134, the intermediate pressure turbine 128 drives the intermediate pressure compressor 120 via an intermediate pressure spool 136, and the low pressure turbine 130 drives the fan 112 via a low pressure spool 138.

In order to meet certification requirements, portions of aircraft, such as the engine 100, are required to be able to function for a specific period of time when exposed to fire, for example during a fire event. As such, aircraft typically include fireproof systems that function to isolate different areas (or zones) of the engine 100 such that a fire event in one area will not spread into another area. As used herein, the term fireproof refers to fire protection for a subject component or system that satisfies a designated requirement or regulation, such as FAA requirements for aircraft. Such requirements typically require that the fireproof systems are capable of providing protection from a fire event at a predetermined temperature for a predetermined amount of time. In one exemplary embodiment, a fireproof system may be installed in a portion such as portion 200 of FIG. 1 to prevent or inhibit a fire event from spreading between the outer duct 116 and the inner duct 118 through the inner casing 142, i.e., to render this portion 200 of the aircraft as fireproof according to the applicable standard.

Figure 2:
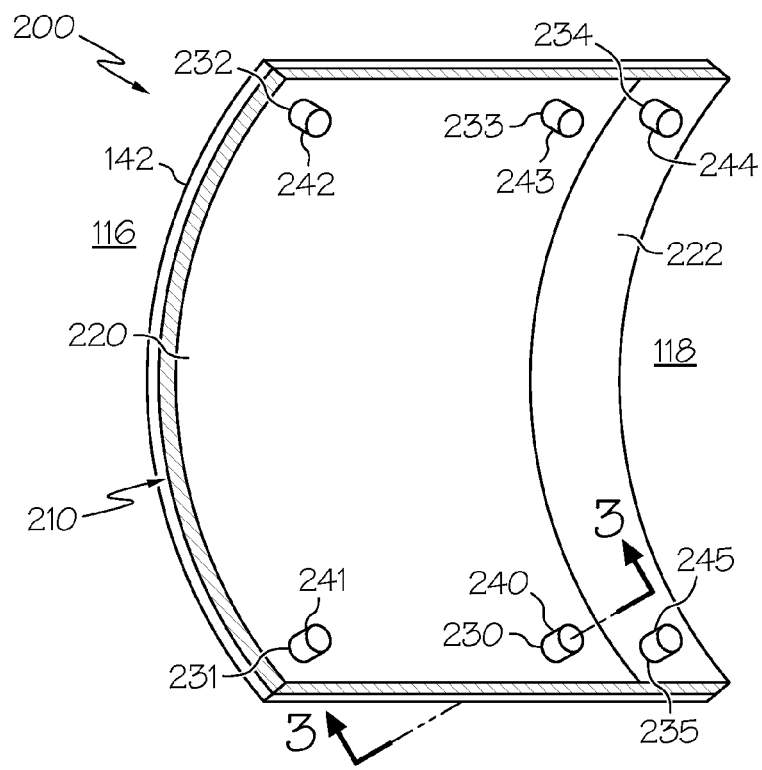
FIG. 2 is a partial isometric view of a fireproof system in the gas turbine engine of FIG. 1 in accordance with an exemplary embodiment.

FIG. 2 is a partial isometric view of the portion 200 in the gas turbine engine 100 of FIG. 1 and particularly shows a fireproof system (or "fireproofing" system or "fire protection" system) 210 in accordance with an exemplary embodiment. The fireproof system 210 prevents or inhibits a fire event from being fed through a breach in the inner duct 118 or a breach in the outer duct 116, and may also be considered a fire suppression system or a fire containment system. In general, the fireproof system 210 may be installed or incorporated into any location in which fireproofing is desired, including other locations within the engine 100. As noted above, each of the inner duct 118 and the outer duct 116 are at least partially defined by the inner casing 142. As such, the fireproof system 210 is installed on the inner casing 142 and includes at least one fire resistant panel 220 and 222 and at least one fire retardant device 240-245.

The fire resistant panels 220 and 222 are generally planar in shape and may be contoured to match the inner casing 142. The fire resistant panels 220 and 222 are secured to the inner casing 142 at attachment points 230-235. In the exemplary embodiment, two fire resistant panels 220 and 222 are adjacent to one another on the inner casing 142, although any number and arrangement of fire resistant panels 220 and 222 may be provided. Similarly, any number of attachment points 230-235 may be provided. For example, the fire resistant panel 220 has four attachment points 230-233, which includes one at each corner, and the fire resistant panel 222 has two attachment points 234 and 235, which includes one at each longitudinal end.

The fire resistant panels 220 and 222 are generally configured to substantially withstand a nearby fire largely intact, i.e., the fire resistant panels 220 and 222 are not consumed by direct contact with fire for a predetermined amount of time. The fire resistant panels 220 and 222 protect the inner casing 142 during a fire event by providing a physical and thermal barrier between the fire event and the inner casing 142.

The fire resistant panels 220 and 222 may be manufactured from an insulating and/or flame retardant material such as fiberglass. Other suitable materials may include ceramic, silicone rubber, carbon, silica-alumina, basalt, silicon carbide, zirconium oxide, nitride materials, magnesia, or other types of materials. Further examples of suitable material for the fire resistant panels 220 and 222 include carbon fiber, polymer matrix composites (PMCs), ceramic matrix composites (CMCs), metal matrix composites (MMC), each for a wide variety of fibers including carbon, graphite, fiberglass, aramid, and polyethylene. The fire resistant panels 220 and 222 may be a composite and, in at least one exemplary embodiment, is structurally self-supporting. In one embodiment, the fire resistant panels 220 and 222 may only be a single layer although multiple layers may be provided. Additional treatments and coatings may be provided to the fire resistant panels 220 and 222.

In conventional systems, the mechanism for installing a fire resistant panel may deteriorate faster than the fire resistant panel itself. For example, if the fastener that mounts a fire resistant panel onto a surface fails, such as if the fastener is melted, the fire resistant panel may become detached from the surface, thereby rendering the fire resistant panel unsuited for its intended purpose. In such an event, the fire may breach the surface at the through hole previously occupied by the fastener and fire resistant panel. Accordingly, fire retardant devices 240-245 are mounted on the fire resistant panels 220 and 222 at each of the attachment points 230-235 of the fire resistant panels 220 and 222 to mitigate the adverse impact of a fire event in these areas, as described in greater detail below.

Figure 3:
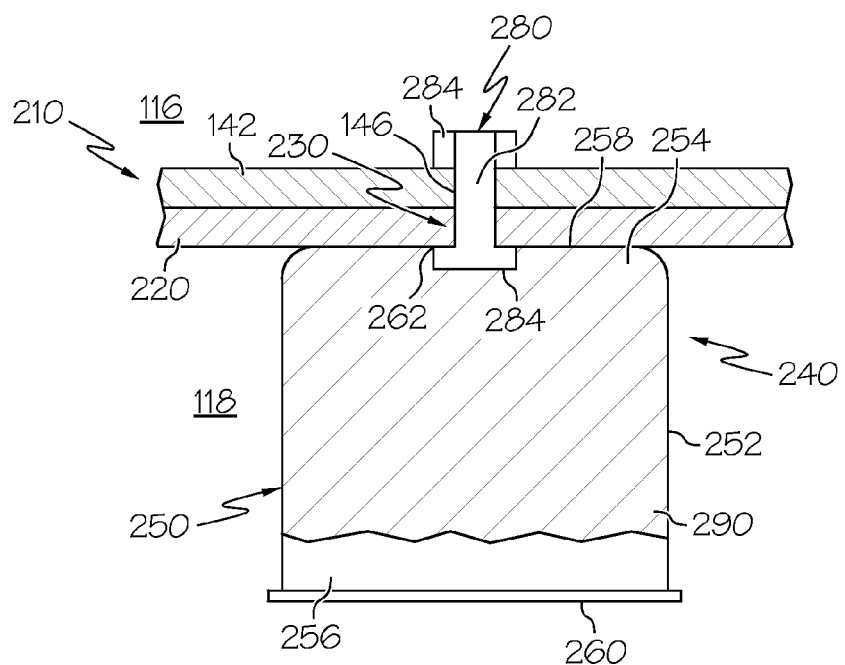
FIG. 3 is a partial cross-sectional view of the fireproof system of FIG. 2 through line 3-3 in an inactive condition.

FIG. 3 is a partial cross-sectional view of the fireproof system 210 of FIG. 2 along line 3-3 in an inactive condition. FIG. 3 particularly illustrates a portion of the fireproof system 210 that includes the fire resistant panel 220 and the fire retardant device 240, although the discussion below may be applicable to the fire resistant panel 222 and the other fire retardant devices 241-245. As shown in FIG. 3, the fire retardant device 240 is mounted on the fire resistant panel 222 at the attachment point 230, which is typically embodied as an attachment opening extending through the fire resistant panel 220. In general, the fire retardant device 240 and the fire resistant panel 220 are mounted within the inner casing 142, i.e., within the inner duct 118. However, in other embodiments, the fire retardant device 240 and the fire resistant panel 220 may be mounted on the other side of the inner casing 142, i.e., within the outer duct 116. Further embodiments, may have fire retardant devices 240 and fire resistant panels 220 mounted on both sides of the inner casing 142.

Figure 4:
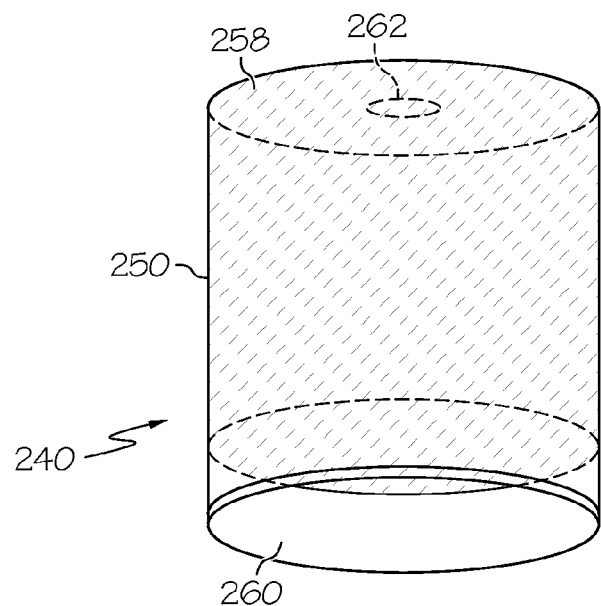
FIG. 4 is an isometric view of a fire retardant canister of the fireproof system of FIG. 2 in the inactive condition.

The fire retardant device 240 includes a container, such as a canister 250, that is generally cylindrical with a side wall 252 that defines first and second ends 254 and 256 and extends axially from the fire resistant panel 220. An end wall 258 closes the first end 254 and a detachable cap 260 at least partially closes the second end 256. In one exemplary embodiment, the end wall 258 is flat, although the end wall 258 may have a curvature, particularly to match the fire resistant panel 220. FIG. 4 is an isometric view of the fire retardant device 240 of FIG. 3 removed from the fireproof system 210.

The canister 250 may be fabricated from any suitable materials that are compatible with the environment of the engine 100. A representative material may include stainless steel, although other materials may be provided. Although the canister 250 is cylindrical, any shape may be provided, including square or irregular. Additionally, the canister 250 may have any suitable height and diameter. For example, the shape of the canister 250 may be based on the size of the attachment opening 230 and/or fastener 280, characteristics of the area to be protected, sizing characteristics with respect to other components in the engine 100, and weight. In one exemplary embodiment, the canister 250 may have a diameter of approximately 1 to 4 inches and a depth of approximately 0.25 to 4 inches. In general, the canister 250, as depicted, has a generally circular cross-section. However, the canister 250 is not restricted to circular cross-sectional shapes. For example, the canister 250 may have a square cross-sectional shape.

Referring to both FIGS. 3 and 4, the fire retardant device 240 is mounted on the fire resistant panel 220 with the fastener 280. Particularly, the end wall 258 of the fire retardant device 240 defines an attachment point, which in this exemplary embodiment is an opening 262 for receiving a fastener 280. In this exemplary embodiment, the fastener 280 is a threaded screw 282 and a corresponding nut 284. The screw 282 extends through the opening 262 in the canister 250, through the attachment point 230 of the fire resistant panel 220, through an opening 146 in the inner casing 142, and into the outer bypass 116, fire resistant panel. The nut 284 engages the end of the screw 282 to secure the fireproof system 210 to the inner casing 142. The fastener 280 may be any suitable fastening mechanism, including clips, tabs, and rivets. In one exemplary embodiment, the screw 282 may be reversed and the nut 284 may engage the screw 282 on the outer bypass side of the inner casing 142. In a further exemplary embodiment, the canister 250 may have a strap that interacts with a corresponding clamp, which would be particularly useful in a vibratory environment. In the depicted exemplary embodiment, the components of the fire retardant device 240 are fastened together and mounted on the structure to be protected, i.e., the inner casing 142, with a single fastener 280. In other embodiments, the fastener 280 may not include a screw and/or aperture extending through the canister 250. Instead, the fastener 280 may be formed by a tab or projection extending from the side wall 252 or the end wall 258 that mates with a corresponding tab or attachment mechanism on a fire resistant panel.

The canister 250 houses a fire retardant agent 290. The fire retardant agent 290, in the inactive condition shown in FIGS. 3 and 4, is a solid composition selected for fire retardant properties. Suitable examples are discussed below. The fire retardant agent 290 is additionally selected to maintain a solid state in the inactive condition until the canister 250 is exposed to the elevated temperatures of a fire and the fire retardant agent 290 transitions into an active condition.

Figure 5:
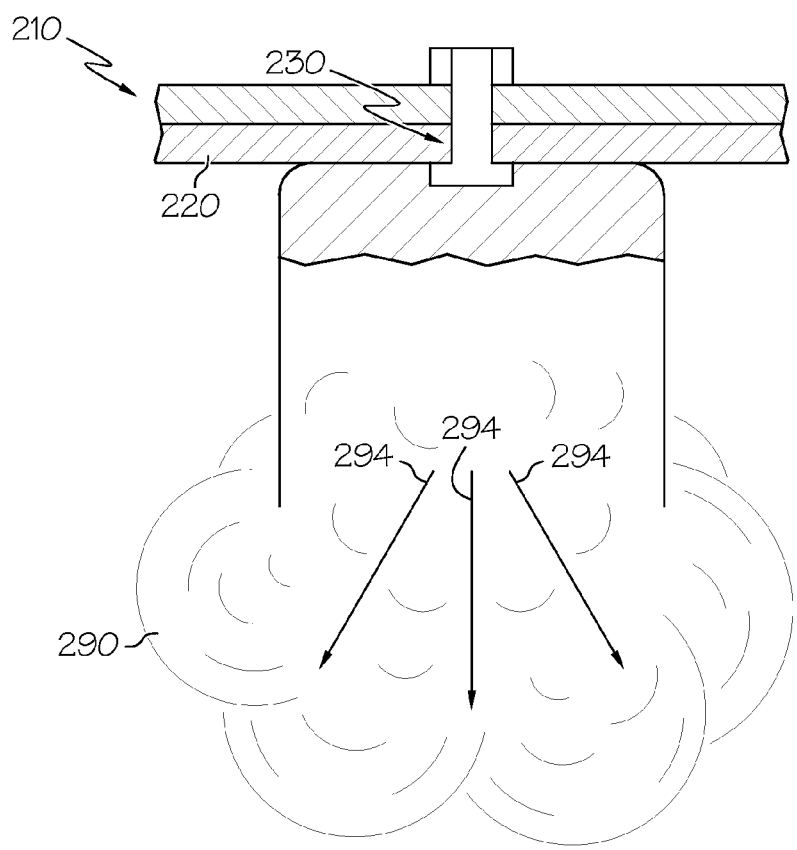
FIG. 5 is the cross-sectional view of the fireproof system of FIG. 3 in an active condition.

FIG. 5 is a cross-sectional view of a fireproof system 210 in the active condition, which may be a foam or vapor. The fire retardant agent 290, in the active condition, expands in the direction indicated by arrows 294 and functions to suppress the fire, particularly the area around the attachment point 230 of the fire resistant panel 220. In one exemplary embodiment, the fire retardant agent 290 in made up of a single component that expands as shown in FIG. 5 and that functions to suppress the fire. However, in another exemplary embodiment, the fire retardant agent 290 may include a first component that expands as shown in FIG. 5 and that functions as a carrier for a second component that suppresses the fire. In the active condition, the fire retardant agent 290 may function as a low oxygen content gas barrier (i.e., as a gas) or a direct thermal barrier (i.e., as a foam) between the fire and the area to be protected, such as the attachment point 230. As such, the fire retardant agent 290 may be "self-foaming" or "self-sublimating" (or "self-ablative") based on the predetermined temperature. In one exemplary embodiment, the predetermined temperature is about 800-1200° F. In other exemplary embodiments, the predetermine temperature may be, for example, about 350° F. 400° F., and 900° F., although the fire retardant agent 290 may be designed for any temperature. The fire retardant device 240 may provide a standardized size and shape such that, after a fire event, the depleted fire retardant device 240 may be removed and replaced, as necessary or desired.

Examples of suitable materials that compose the fire retardant agent 290 include intumescents that expand upon application of heat to insulate an underlying substrate of an area to be protected, such as the attachment point 230. In addition to the insulating properties, materials such as intumescents may also form a protective char layer that when combined with the insulating barrier provides a higher degree of protection. In some exemplary embodiments, intumescent materials function by either chemical or physical action. Example of chemical action include the use of a carbon-rich char forming source such as glucose or a phosphoric acid source such as ammonium phosphate to promote char formation and a gas releasing intumescent source such as urea or chlorinated paraffin. Physical intumescents include expandable graphite coatings. Expandable graphite flakes are formed by the introduction of intercalants such as sulfuric or nitric acid that expand the graphite layers upon exposure to heat. The resulting expansion may be on the order of 200 times the original thickness, providing a high degree of protection to the substrate. Solid-phase retardants may form a carbonaceous char layer on the surface of the substrate that inhibits further burning. High char formation resin systems such as some epoxy and BMI formulations provide this intrinsic benefit. Other examples of suitable material that compose the fire retardant agent 290 include ablatives, perfluorocarbons (PFCs), hydrofluorocarbons (HFCs), water, $NaHCO_3$, potassium acetate, labile bromine suppressants, or inert gases such as $N_2$, $CO_2$, or Ar. One suitable example is Halon 1211 ($CF_2BrCl$) that in the active condition displaces the oxygen feeding the fire and additionally generates Br and Cl atoms that interfere with flame chemistry. Generally, no propellant is necessary, but such distribution aids may be provided. Additionally, one or more intumescents or other materials may be combined to select desirable combinations of expansion characteristics and fire retardant characteristics. The base components of the fire retardant agent 290 may be selected from commercially available sources.

The fire retardant agent 290 may be maintained in the canister 250 in the supported in the canister 250 in the inactive state in a number of ways. For example, the fire retardant agent 290 may include a binder to adhere the fire retardant agent 290 to the walls of the canister 250 or the fire retardant agent 290 itself may have suitable adhesion properties to stay in the inactive state in the canister 250. In general, any suitable mechanism, including physical mechanisms, may be provided. Exemplary binder may include adhesives such as epoxy or silicone that do not interfere with the transition of the fire retardant agent 290 from the inactive state to the active state.

Containment.

The detachable cap 260 may be coupled to the canister 250 with a resilient snapping engagement or cooperating screw threads. The detachable cap 260 on the second end 256 of the canister 250 prevents contamination of the fire retardant agent 290. The cap 260 may define a number of holes that allow the fire retardant agent 290 to be released in the active condition or the cap 260 may be forced off by the fire retardant agent in the active condition. Alternatively, the cap 260 may have a relatively low melting point such that it readily detaches from the canister 250 during a fire event.

The number and arrangement of fire retardant devices 240-245 (FIG. 2) may be varied to optimize the desired characteristics of the fireproof system 210. Because the canister 250 may be efficiently located, the amount of fire retardant agent 290 may be minimized. The amount of fire retardant agent 290 and the size of the canister 250 may be selected based on number of factors, including the anticipated temperature of the fire, the duration of the fire, and the size of the area to be protected. Computational fluid dynamics or test fires may be used to further optimize the fireproof system 210. Additionally, although the fire retardant device 240 is depicted in a particular orientation that is facing downward, the fire retardant device 240 also functions in any orientation, such as for example, when a fire is located above or on one of the sides of the fire retardant device 240. In a typical situation, the second end 256 of the fire retardant device 240 is oriented toward the anticipated direction of a fire.

Accordingly, improved fireproofing systems 210 have been described. The fireproof system 210 may relatively lightweight, particularly as compared to adding additional fire resistant panels. Additionally, the fireproof system 210 includes few parts and is relatively simple to implement to improve the safety of the corresponding engine 100. Unlike conventional fireproof systems, the fireproof system 210 provides fireproofing directly to desired areas without the need for additional tubing, pipe, and pumps and without the attendant costs, weight, volume, and complexity In general, the fireproof systems 210 may be implemented into any one of numerous applications in which isolation from a fire may be desired. For example, although the fireproof system 210 is depicted in an aircraft engine between two ducts, other exemplary environments may include aircraft engine nacelles, electronic cabinets, aircraft cabins, telecommunication or electrical power switching stations, fume hoods, natural gas pipelines, chemical distribution cabinets, chimneys, petrochemical refineries, and the like While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A fireproof system for protecting a structure during a fire event, the system comprising:
   a fire resistant panel defining a first attachment opening and disposed adjacent to the structure;
   a canister including
      a side wall defining a first end and a second end, and
      an end wall enclosing the first end and defining a second attachment opening that is aligned with the first attachment opening;
   a fastener extending through the canister at the second attachment opening and the fire resistant panel at the first attachment opening such that the canister, the fire resistant panel, and the structure are fastened together; and
   a fire retardant agent disposed within the canister in an inactive condition and configured to transition out of the second end of the canister in an active condition at a predetermined temperature.

2. The fireproof system of claim 1, wherein the fire retardant agent is a solid in the inactive condition and a vapor in the active condition.

3. The fireproof system of claim 1, wherein the fire retardant agent is a solid in the inactive condition and a foam in the active condition.

4. The fireproof system of claim 1, further comprising a detachable cap configured to at least partially close the second end.

5. The fireproof system of claim 1, wherein the side wall is cylindrical.

6. The fireproof system of claim 1, wherein the fire retardant agent is at least one of a perfluorocarbon (PFC), a hydrofluorocarbon (HFC), or an intumescent material.

7. The fireproof system of claim 1, wherein the canister is a first canister and the fastener is a first fastener, the fire resistant panel additionally defining a third attachment opening, and the fireproof system further comprising:
   a second canister mounted on the fire resistant panel, wherein the fire retardant agent is additionally disposed within the second canister; and
   a second fastener configured to couple the second canister to the fire resistant panel and the structure at the third attachment opening.

8. The fireproof system of claim 7, wherein the fire resistant panel is a first fire resistant panel and the fireproof system further comprises:
   a second fire resistant panel disposed adjacent to the first fire resistant panel on the structure and defining a fourth attachment opening;
   a third canister mounted on the second fire resistant panel, wherein the fire retardant agent is additionally disposed within the third canister; and
   a third fastener configured to couple the third canister to the second fire resistant panel and the structure at the fourth attachment opening.

9. The fireproof system of claim 1, wherein the fire retardant agent is foams at the predetermined temperature.

10. The fireproof system of claim 1, wherein the fire retardant agent is sublimates at the predetermined temperature.

11. The fireproof system of claim 1, wherein the fastener is a screw that extending through the first attachment opening and the second attachment opening.

12. A method for suppressing a fire event proximate to an aircraft engine component, comprising the steps of:
- installing a fire resistant panel on the aircraft engine component at a first attachment point;
- providing a canister with a fire retardant agent disposed therein; and
- mounting the canister on the fire resistant panel at the first attachment point.

13. The method of claim 12, wherein the providing step includes providing the fire retardant agent with a composition that is a solid in an inactive condition and expands out of the canister in an active condition during the fire event.

14. The method of claim 12, wherein the installing step includes installing the fire resistant panel on the aircraft engine component with a fastener, and the mounting step includes mounting the canister on the fire resistant panel with the fastener through the first attachment opening.

15. The method of claim 12, further comprising the step of replacing the canister on the fire resistant panel at the first attachment point after the fire event.

\* \* \* \* \*